Nov. 17, 1959     I. NESSON     2,913,266
COUPLING FOR WINDSHIELD WIPER ARMS
Filed April 16, 1954     3 Sheets-Sheet 1
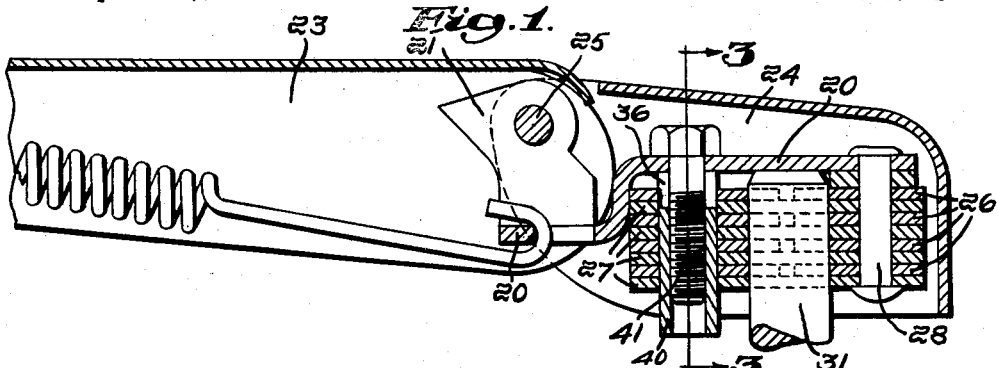
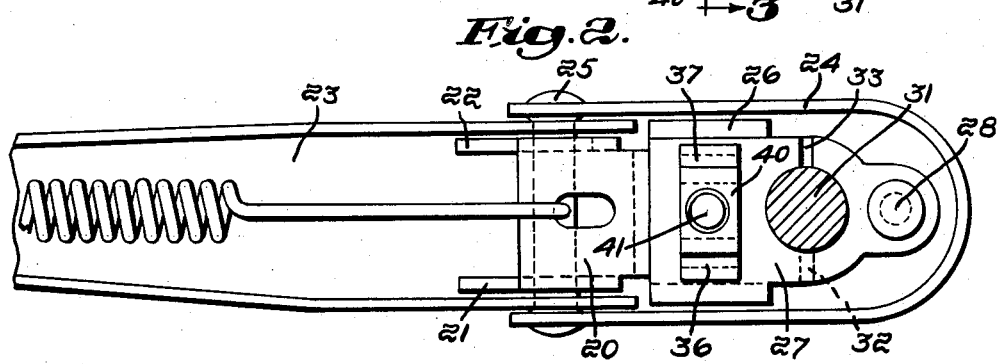
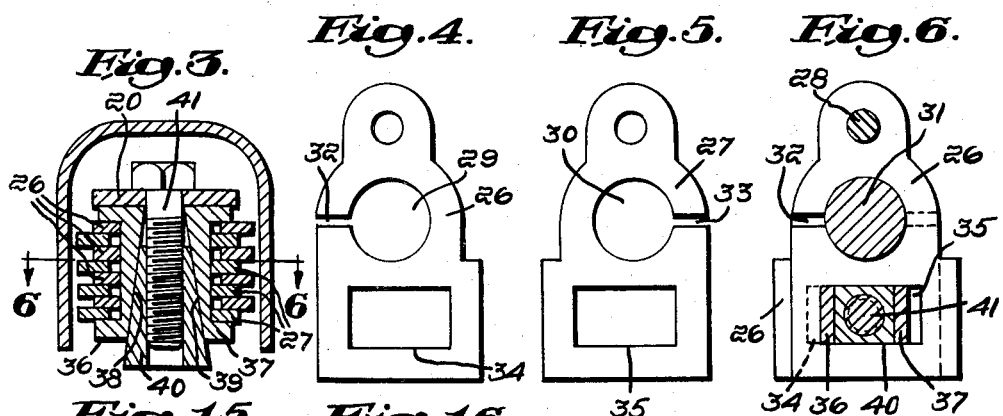
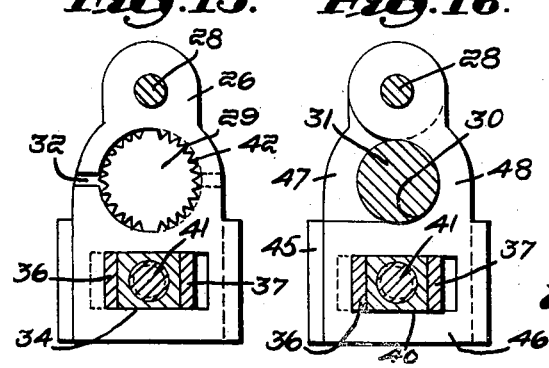
Inventor:
Israel Nesson,
by Thomson & Thomson
Attorneys Nov. 17, 1959     I. NESSON     2,913,266
COUPLING FOR WINDSHIELD WIPER ARMS
Filed April 16, 1954     3 Sheets-Sheet 2
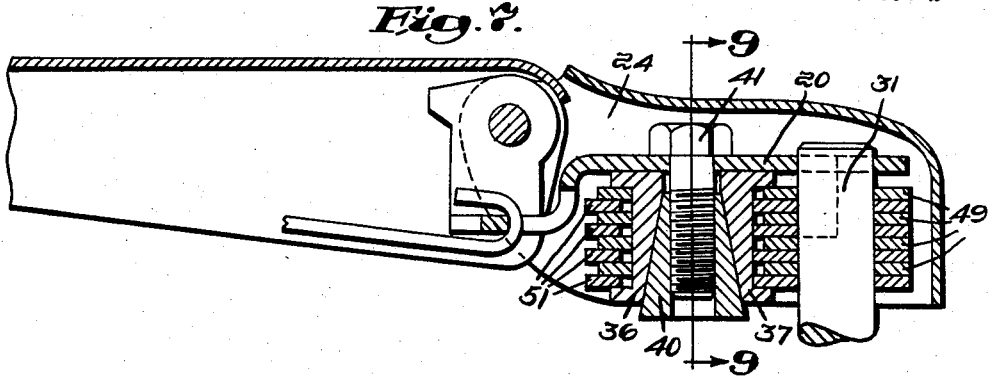
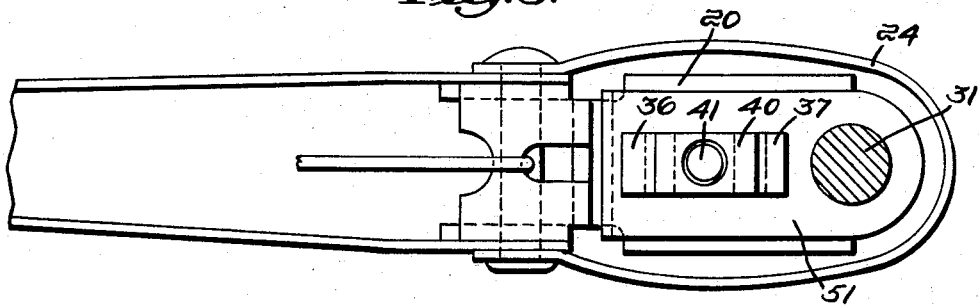
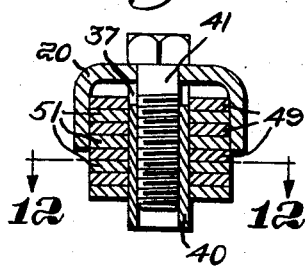 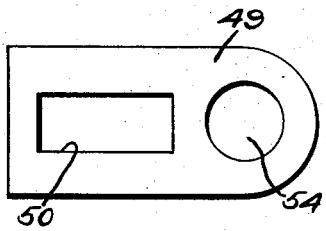 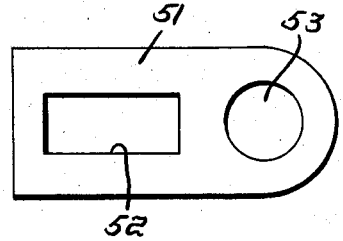
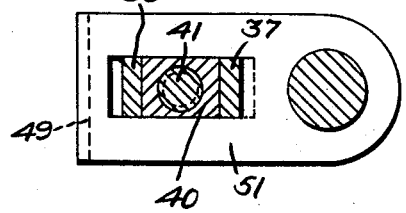
Inventor:
Israel Nesson,
by Thomson & Thomson
Attorneys

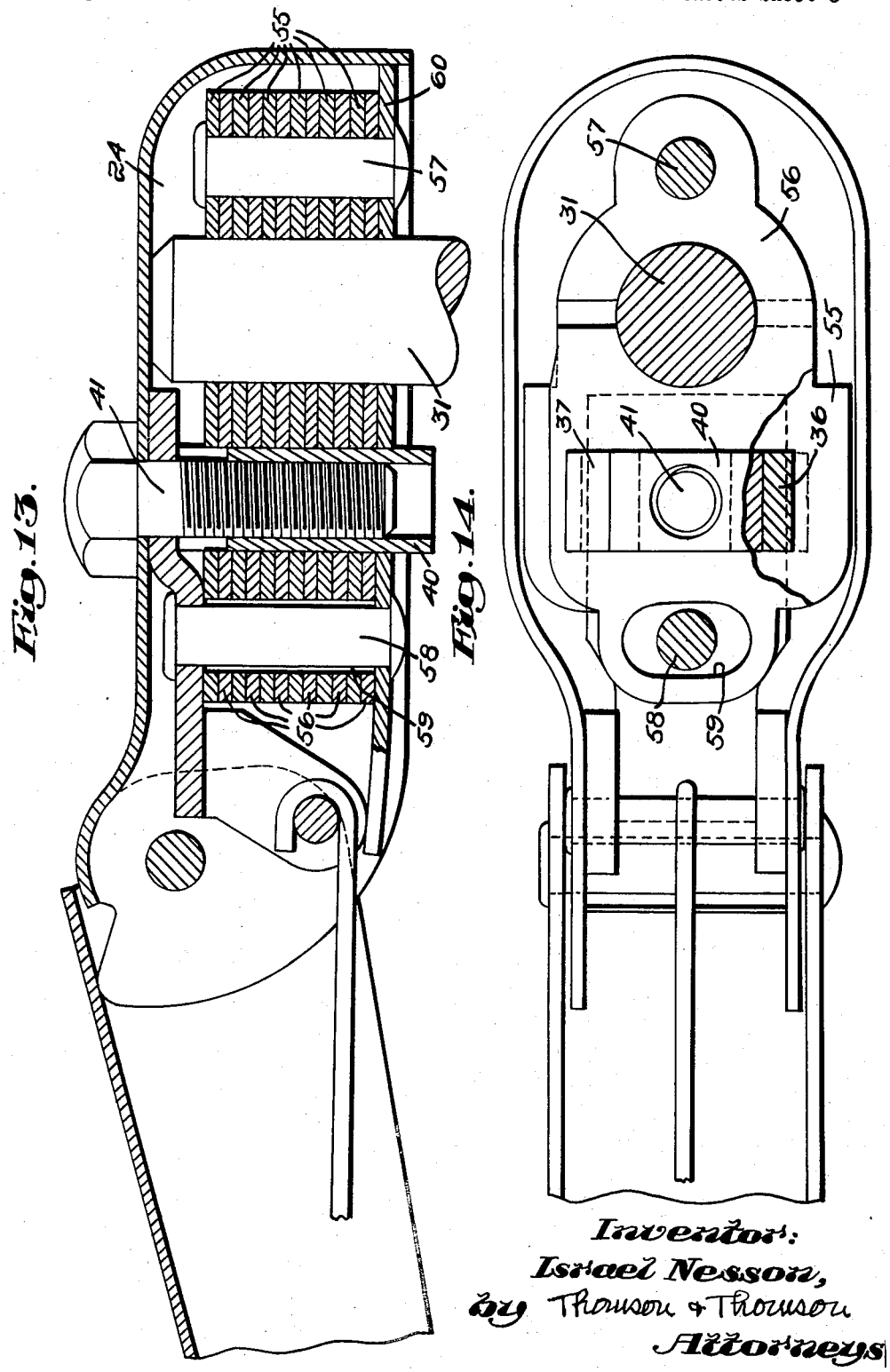

United States Patent Office 2,913,266
Patented Nov. 17, 1959

2,913,266

COUPLING FOR WINDSHIELD WIPER ARMS

Israel Nesson, Lynn, Mass., assignor to Max Zaiger, Swampscott, Mass.

Application April 16, 1954, Serial No. 423,635

6 Claims. (Cl. 287—53)

This invention relates in general to couplings for connecting a working arm to a drive shaft, and pertains more particularly to the type of couplings which are used in the automotive field for attaching a wind shield wiper arm to the shaft of the motor which drives the wiper.

Certain of the couplings commonly used for this purpose are keyed to the motor shaft in some manner to prevent slippage of the arm when torque is applied. For example, serrated or splined bushings may be attached to the shaft and engage mating parts of the coupling. This type of construction does not permit fine angular adjustment of the arm with respect to the shaft as the adjustment is necessarily performed in discrete steps, the magnitude of which depends on the number of serrations. Furthermore, it is necessary to disconnect the arm from the shaft in order to change the angular setting, as these couplings can be used only on the particular type of shaft for which they are designed, and the shaft ends must be suitably machined at the factory. Clamp type of connectors, which have hitherto been designed for smooth shafts are bulky and expensive, and are not accessible for tightening and adjusting.

The general object of this invention is to provide a wiper arm coupling which permits very fine angular adjustment of the arm with respect to the shaft so as to facilitate correct placement of the wiper arm with respect to the windshield, which requires no special machining of the shaft end, which occupies very little space and yet has adequate bearing area to grip the smooth shaft securely, which has a certain amount of resilience so that it will not be dislodged by shock or vibration, which is readily accessible for tightening and can be tightened with an ordinary screw driver, and which is made of inexpensive parts, mainly stampings of sheet metal.

The device consists in general of a plurality of plates of sheet metal, arranged in a stack and having holes through which the shaft may pass, alternate plates in the stack having offset slots. A wedge member cooperating with a tightening screw is disposed in the slots and, when the screw is tightened, tends to shift the position of alternate plates so as to cause the two interleaved sets to grip the shaft tightly.

In the drawings illustrating the invention:

Fig. 1 is a longitudinal cross-section through one form of coupling embodying the invention;

Fig. 2 is a bottom view of the coupling shown in Fig. 1;

Fig. 3 is a cross-section taken along line 3—3 of Fig. 1;

Fig. 4 is a detail view of one of the locking plates;

Fig. 5 is a detail view of another of the plates;

Fig. 6 is a cross-section taken along line 6—6 of Fig. 3;

Fig. 7 is a longitudinal cross-section of a modification of the coupling;

Fig. 8 is a bottom view of the modification shown in Fig. 7;

Fig. 9 is a cross-section taken along the line 9—9 of Fig. 7;

Fig. 10 is a detail view of one of the locking plates used in the modification of Fig. 7;

Fig. 11 is a detail view of another of the plates used in the modification of Fig. 7;

Fig. 12 is a cross-section taken along line 12—12 of Fig. 9;

Fig. 13 is a cross-section of another modification of the coupling;

Fig. 14 is a bottom view of the modification of Fig. 13;

Fig. 15 is a cross-section similar to Fig. 6, showing a modification of the locking plates; and Fig. 16 is another cross-section similar to Fig. 6, showing another variation of the locking plates.

In the form shown in Figs. 1 to 6, a bracket 20 carries upstanding lugs 21 and 22 to which the wind shield wiper arm 23 is hinged in a conventional manner. The coupling is enclosed in a cap 24 which may be held in place by the screw 25 which forms the hinge pin for the wiper arm. A series of locking plates, alternating ones of which are designated by numerals 26 and 27, respectively, are secured to the bracket 20 by means of a rivet 28. The plates are rotatable about the rivet. The plates 26 have holes 29 and the plates 27 have holes 30 which receive the shaft 31 of the wiper motor.

Preferably the plates have slots 32 and 33, respectively, communicating with the holes so as to provide a certain amount of resiliency when the assembly is tightened. The plate 26, illustrated in Fig. 4, has a rectangular opening 34 which is offset to the right with respect to the center of hole 29, and the plate 27, illustrated in Fig. 5, has a similar rectangular opening 35 which is offset to the left with respect to the center of hole 30. The plates are actually duplicate stampings turned in opposite directions.

As shown in Fig. 3 a pair of angular members 36 and 37 pass through the openings 34 and 35 of the stack of plates. These members have sloping back surfaces 38 and 39, respectively, designed to cooperate with a wedge member 40. The wedge member is tapped to receive a screw 41. When the screw is tightened to draw up the wedge member 40 the angular member 36 is forced against the left-hand wall of openings 34 in the series of plates 26 and the angular member 37 is forced against the right-hand wall of openings 35 of the series of plates 27. The plates 26 are thus drawn to the left and the plates 27 to the right. Alternate sets of plates are thus displaced in opposite directions about rivet 28, and the holes 29 and 30 are moved out of alignment. This displacement causes the series of plates 27 to grip the left side of the shaft and the series 26 to grip the right side of the shaft (as seen in Fig. 6).

To adjust the coupling so as to set arm 23 in any angular position with respect to shaft 31, the screw 41 is loosened and the arm is set in the desired position. The arm need not be entirely disconnected from the shaft, as is required with other types of couplings. The screw is then tightened until the required gripping force is exerted on the shaft. It will be noted that screw 41 is in such a position that it can be rotated for tightening without throwing the arm out of alignment with respect to the shaft. A coupling of this type made up with a number of plates has sufficient bearing area to hold the arm securely on the shaft by friction alone. Fig. 15, however, illustrates a modification of the locking plates which is useful for transmitting high torques, especially when the shaft is made of soft metal.

In Fig. 15 the plates 26, instead of having a smooth hole as in Fig. 4 to receive the motor shaft, have a number of serrations 42 about the hole on the side opposite slot 32, which tend to bite into the shaft. The other set of plates 27 have oppositely disposed serrations. This form of plate is best used on shafts made of soft metal into which the teeth will penetrate and provide a more secure grip. The rectangular openings are disposed as in Figs. 1 to 6 and the action of the wedge assembly is the same as that previously described.

It will be noted that the portion of plate 26 disposed to the left of the shaft, and the portion of plate 27 disposed to the right of the shaft, do not contribute to the gripping action. These portions are useful, however, as they support the gripping portions of the adjoining plates and prevent buckling when the drive torque and, consequently, the gripping force required, are relatively high. For low torque requirements the modification shown in Fig. 16 may be satisfactory. In Fig. 16 a modified form of plates is employed. These plates 45 and 46 have oppositely disposed curved arms 47 and 48 which pass around the shaft 30 and are secured together by the rivet 28. This type of plate has the same offset rectangular openings as those previously described and the same wedge assembly may be employed. Each of the arms 45 and 46 embraces half of the shaft circumference and the clamping action is very much the same as in the form shown in Figs. 1–6.

In Figs. 9 to 12 a modification is shown in which the alternate plates in the stack, upon tightening of the locking screw, are radially displaced with respect to shaft 31 rather than in an angular direction. One set of plates 49 has rectangular openings 50 and the other set of plates 51 has rectangular openings 52, the latter being spaced further from the hole 53 intended to receive the shaft than openings 50 spaced from the corresponding hole 54. The angle members 36 and 37, which in this case are aligned with the arm instead of at right angles to the arm, engage the left-hand walls of openings 50 and the right-hand walls of openings 52 (as viewed in Figs. 7 and 8). When the screw is tightened the wedge member 40, cooperating with members 36 and 37, forces the plates 49 to the left and the plates 51 to the right, causing the alternate sets of plates to grip the right and left-hand side of shaft 30. This assembly does not require a rivet to provide a fulcrum point as does that illustrated in Figs. 1 to 6. It is understood that serrations or teeth could be provided in appropriate sides of the holes 53 and 54 as in Fig. 15.

Fig. 13 shows a modifications which can be adjusted and tightened without removing the cap 24. In this modification the alternate sets of plates 55 and 56 are secured together by two rivets 57 and 58. The plates are provided with elongated holes 59 which receive the rivet 58 so that the plates may rotate about rivet 57, which serves as a fulcrum in the same manner as rivet 28. The plates have offset rectangular openings similar to openings 34 and 35, and the same wedging assembly is employed, the only difference being that the head of screw 41 is disposed outside the cap 24 and passes through the cap into the coupling. The rivet 58 serves to hold the plate assembly in alignment when the screw 41 is removed to permit the cap to be taken off. This assembly is preferably provided with a stationary bottom plate 60 (shown removed in Fig. 14) which provides a bearing for the bottom heads of rivets 57 and 58. The bottom plate has a suitable opening to admit the wedge and angle members.

The number of plates employed in the stack may be varied, and depends on such factors as the clamping force required, the space available, and the lenth of shaft available for connection. In general, it is desirable to use as many plates as practical considerations permit, both to distribute the bearing surface, and thus minimize scoring of the shaft, and to provide sufficient depth in the stack to ensure against tilting of the stack with respect to the shaft. It is apparent, however, that three plates, the outer of which grips one side of the shaft and the intermediate of which grips the other side, will function in the manner here described. It is, therefore, understood that a "set" of plates, as employed herein, may refer to a single plate.

The coupling here described, while intended primarily for windshield wipers, can be used in other devices. In general, this type of coupling may be employed to advantage wherever unlimited, fine angular adjustment of an arm with respect to a shaft is desired, and the torque load is not so high as to preclude the use of a friction grip, or press fit.

What is claimed is:

1. A coupling for connecting a windshield wiper arm, or the like, to a drive shaft, comprising a first set of stacked plates having arcuate arms, a second set of plates interleaved with the first and having oppositely curved arcuate arms, the arms of the two sets of plates defining between them a generally cylindrical shaft receiving hole, means connecting all the plates together while permitting rotation of the same about an axis parallel to that of the hole, aligned openings in the first set of plates, aligned openings in the second set of plates partially overlapping those of the first set, a first wedge member having a wedge face disposed in the overlapping part of said openings, a second wedge member having a wedge face disposed in said overlapping part opposite the face of the first wedge member, said wedge members tending, when forced apart, to draw said openings into alignment, a third wedge member disposed between the first and second wedge members and having inclined surfaces adapted to engage said wedge faces, said third wedge member having a threaded recess disposed at right angles to the plates, and a screw engaged in said recess and adapted to move the third wedge member at right angles to the plates to force the other two wedge members apart thereby rotating one set of plates clockwise and the other set counter-clockwise about said axis and thereby move said arms to distort said hole, and produce a gripping action on a shaft disposed therein; and means connected to said plates for securing the coupling to the wiper arm.

2. A coupling, for connecting a windshield wiper arm, or the like, to a drive shaft, comprising a first set of stacked plates, a second set of plates interleaved with the first set, a cylindrical member running through all said plates at right angles thereto, said plates being rotatable about said member, means connected to said plates for securing the coupling to the wiper arm, a first set of aligned openings in said first set of plates offset from a radius of said cylindrical member in the counter-clockwise direction, a second set of aligned openings in said second set of plates offset from said radius in the clockwise direction and partially overlapping the first set of openings, shaft receiving holes in all said plates centered on said radius, a first wedge member having a wedge face disposed in the overlapping part of said openings, a second wedge member having a wedge face disposed in said overlapping part opposite the face of the first wedge member, said wedge members tending, when forced apart, to draw said openings into alignment, a third wedge member disposed between the first and second wedge members and having inclined surfaces adapted to engage said wedge faces, said third wedge member having a threaded recess disposed at right angles to the plates, and a screw engaged in said recess and adapted to move the third wedge member at right angles to the plates to force the other two wedge members apart, thereby rotating said first set of plates clockwise and said second set of plates counter-clockwise about said cylindrical member.

3. A coupling as described in claim 2, said first set of plates having slots communicating with the shaft receiving holes thereof on the clockwise side of said radius, and the second set of plates having slots communicating with the shaft receiving holes thereof on the counter-clockwise side of said radius.

4. A coupling as described in claim 2, the shaft receiving holes of the first set of plates having serrated walls on the side counter-clockwise of said radius and the holes of the second set of plates having serrated walls on the opposite side.

5. A coupling as described in claim 2, having a retaining member traversing the plates at right angles thereto, said plates having enlarged holes in which said retaining member is received.

6. A coupling, for connecting a windshield wiper arm, or the like, to a drive shaft, comprising a first set of stacked plates, a second set of plates interleaved with the first set, a cylindrical member running through all said plates at right angles thereto, said plates being rotatable about said member, means connected to said plates for securing the coupling to the wiper arm, a first set of aligned openings in said first set of plates offset from a radius of said cylindrical member in the counter-clockwise direction, a second set of aligned openings in said second set of plates offset from said radius in the clockwise direction and partially overlapping the first set of openings, each of said first set of plates having a curved wall portion adapted to engage the shaft and each of the second set of plates having a curved wall portion adapted to engage the shaft, the respective wall portions of the two sets of plates being spaced apart to receive the shaft between them, thereby permitting rotation of said first set of plates clockwise and said second set of plates counter-clockwise about said cylindrical member, a first wedge member having a wedge face disposed in the overlapping part of said openings, a second wedge member having a wedge face disposed in said overlapping part opposite the face of the first wedge member, said wedge members tending, when forced apart, to draw said openings into alignment, a third wedge member disposed between the first and second wedge members and having inclined surfaces adapted to engage said wedge faces, said third wedge member having a threaded recess disposed at right angles to the plates, and a screw engaged in said recess and adapted to move the third wedge member at right angles to the plates to force the other two wedge members apart.

References Cited in the file of this patent

UNITED STATES PATENTS

| | | |
|---|---|---|
| 1,496,803 | Amsler | June 10, 1924 |
| 1,564,382 | Treiman | Dec. 8, 1925 |
| 1,821,452 | Sanford | Sept. 1, 1931 |
| 1,852,477 | Ratigan | Apr. 5, 1932 |
| 2,131,272 | Comins | Sept. 27, 1938 |
| 2,200,988 | Jennings | May 14, 1940 |
| 2,310,276 | Bilz | Feb. 9, 1943 |

FOREIGN PATENTS

| | | |
|---|---|---|
| 497,366 | Great Britain | Dec. 19, 1938 |
| 1,028,717 | France | Feb. 25, 1953 |